April 29, 1924.
W. L. WHITESIDES
DETACHABLE CAN SPOUT
Filed June 5, 1922
1,492,501
2 Sheets-Sheet 1
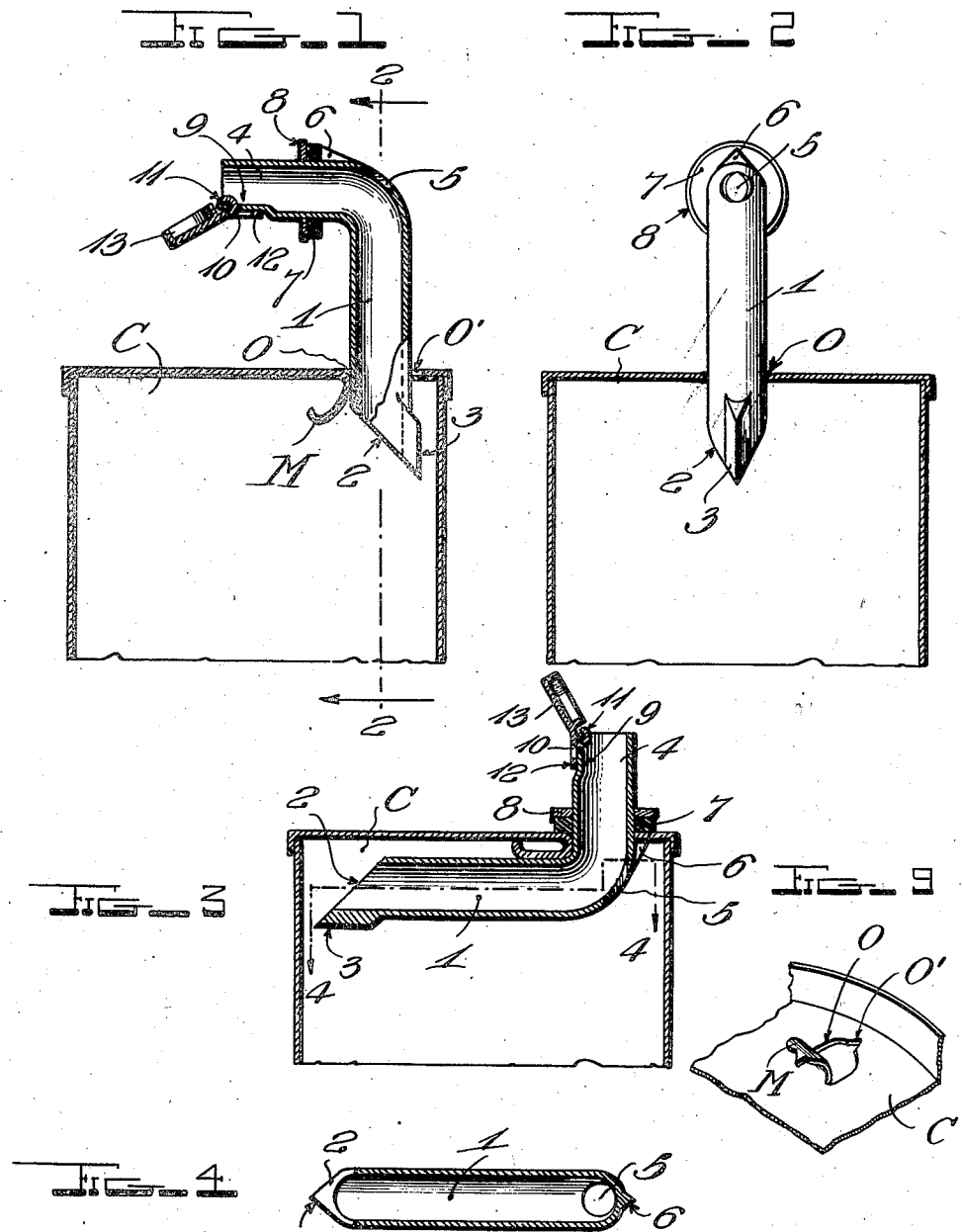
Witness
Inventor
Walter L. Whitesides
By
Attorneys April 29, 1924.
W. L. WHITESIDES
DETACHABLE CAN SPOUT
Filed June 5, 1922   2 Sheets-Sheet 2
1,492,501
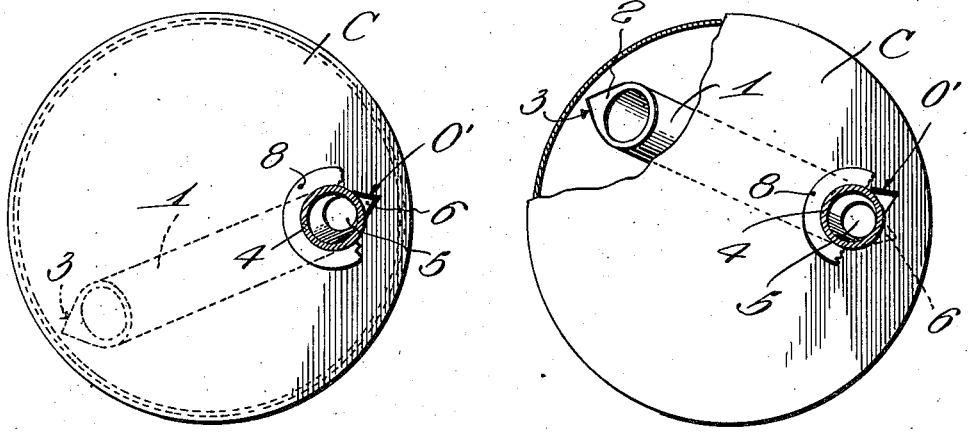
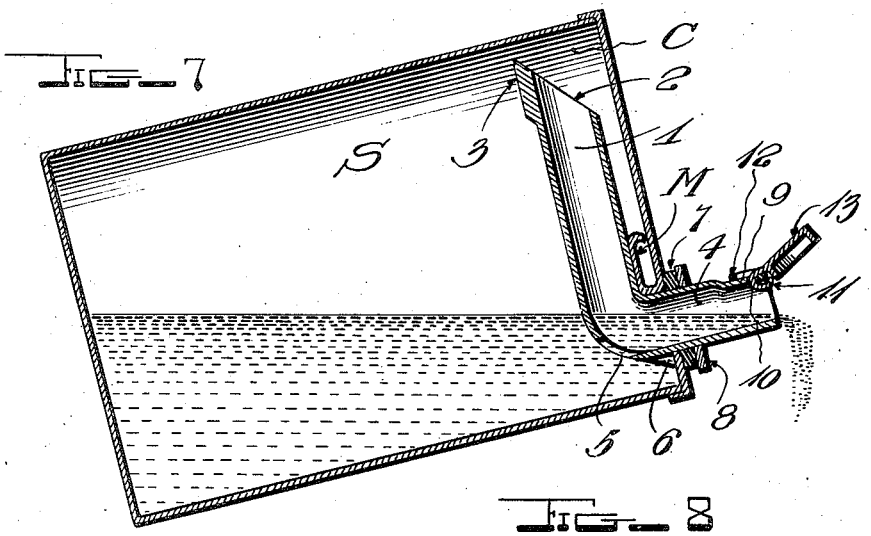
Witness
Inventor
Walter L. Whitesides
By H. B. Wilson & Co.
Attorneys Patented Apr. 29, 1924.

1,492,501

UNITED STATES PATENT OFFICE.

WALTER L. WHITESIDES, OF LONG BEACH, CALIFORNIA.

DETACHABLE CAN SPOUT.

Application filed June 5, 1922. Serial No. 565,924.

*To all whom it may concern:*

Be it known that I, WALTER L. WHITE-SIDES, a citizen of the United States, residing at Long Beach, in the county of Los Angeles and State of California, have invented certain new and useful Improvements in a Detachable Can Spout; and I do declare the following to be a full, clear, and exact description of the invention, such as will enable others skilled in the art to which it appertains to make and use the same.

This invention relates to an improved detachable spout which is especially, but not necessarily, designed for use on milk cans.

The principal object of the invention is to provide a spout which is designed to extend through one side of the can with its inner end positioned in the air space, the spout being formed with a port by means of which the liquid passes into it, and serving to simultaneously permit the discharge of milk and the entrance of air into the vacuum space for insuring a steady flow of milk when the can is tilted in the usual way.

More specifically speaking, it is another object of the invention to devise a spout which is in the form of substantially L-shaped tube, the short reach being designed to pass through the top of the can and the long reach being adapted for parallel disposition beneath the top, the last named reach being equipped with a point to penetrate the top of the can and with a cutter for cutting the material to provide an opening for passage of the short reach.

Another object of the invention is to devise a spout which is such in design that it utilizes the material forced inwardly when the spout pierces it for assisting in holding the spout in place.

A still further object of the invention is to generally improve upon spouts of this class by providing one of extreme simplicity and durability which is practical, easy to install and remove, entirely sanitary, and comparatively inexpensive to both the manufacturer and the user.

Other objects and advantages of the invention will be apparent during the course of the following description.

In the accompanying drawings forming a part of this specification and in which like numerals are employed to designate like parts throughout the same:

Figure 1 is a central vertical section through a portion of a can and through the improved spout showing the first step in placing the latter in position.

Figure 2 is a view at right angles to Figure 1 taken on the line 2—2 thereof.

Figure 3 is a view like Figure 1 showing the spout in position for use.

Figure 4 is a detail section taken on the line 4—4 of Figure 3.

Figure 5 is a horizontal section showing the initial position of the spout just after insertion.

Figure 6 is a view like Figure 5 showing the position after it has been turned slightly to the right to assume its operative position.

Figure 7 is a central vertical section showing the can tilted to dispense a part of the contents.

Figure 8 is a detail perspective view of the closing cap for the spout.

Figure 9 is a detail perspective view showing the manner in which the material cut from the can top is forced laterally and inward in one piece.

Broadly, the invention comprises a hollow tube which has its inner end pointed and provided with a cutter to pierce the top or the side of a can, this inner end being adapted, as before stated, to extend into the vacuum or air space in the can to relieve the vacuum when the can is tilted to permit free flow of the liquid into the tube through a restricted port. The tube is provided between its ends with a shoulder which is adapted to rest against face of one wall of the can adjacent the opening through which the tube passes. The material which is curled inwardly as the spout is forced through the can exerts a slight spring tension against the tube and maintains the shoulder in effective engagement with the can to prevent accidental displacement of the tube and at the same time binds the exteriorly disposed packing and stop flange against the can to insure against escape of the liquid.

Specifically described, the improved spout comprises a substantially L-shaped conduit or tube, the long reach 1 of which is adapted to extend into the can C so as to permit it to be positioned in spaced parallelism with respect to the top. The long reach 1 is of a length to extend into close spaced relation with one side of the can to permit it to extend beyond the liquid level and into the space S to admit air into this space. This inner end is beveled or diagonally cut as indicated at 2 and is equipped with a sharpened and pointed substantially V-shaped enlargement or cutter 3 which serves to simultaneously pierce the can top and cut the material. The short reach 4 of the tube is designed to extend through the opening O formed in the top of the can C. At the juncture of two reaches, a comparatively small port 5 is formed and this serves to permit liquid to enter and be discharged from the tube. The port 5 is smaller in diameter than the discharge end of the tube to prevent this end from becoming filled when the can is tilted, which would otherwise occur if the port was the same or a greater area than the cross-sectional area of the tube. Adjacent this port 5 is a substantially V-shaped locking lug or shoulder 6 which is designed to bear against the inner side of the top of the can when the spout is in place. It may be conveniently mentioned here that as the spout is forced through the top of the can and manipulated to assume the approximate position shown in Figures 3 to 7, the material M which is forced inwardly, is curled substantially as shown and this serves to exert a slight spring tension against the long reach 1 and in so doing forces the shoulder 6 in tight contact with the top of the can. It also has a tendency to bind the packing 7 tightly between the can and the stop flange 8. At its free end, the short reach 4 of the tube is flattened somewhat as indicated at 9 and is provided with an opening 10 in which the hook 11 carried by the finger-piece 12 of a closing cap 13 is positioned. Normally, this cap 13 is closed and in order to open it, the finger is placed against the finger-piece 12 to force it against the flattened part 9 of the tube. It is of course unessential to have the closing cap arranged at the point shown and in some instances it may be positioned at a diametrically opposite point so that it will automatically open when the can is tilted to dispense a part of the contents.

In order to enable the reader to obtain a clear understanding of the manner of installing the improved spout, attention is first directed to Figure 1. As shown in this figure, the long reach of the tube is disposed at substantial right angles to the top of the can and the pointed cutter 3 is forced thru the top at the approximate place shown. A large opening and a small V-shaped opening o' is thus formed and the material is forced inwardly. Then, the spout is manipulated in a manner to bring the shoulder 6 over the opening O' in the top of the can so that it can pass thru this opening to permit it to be brought against the underside of the can top. It is suggested after the shoulder passes thru the small V-shaped opening to then grasp the spout and turn it a part of a revolution toward the right to dispose the shoulder 6 beneath the solid part of the can top. Then, the spout is in operative position as shown in Figure 6. With the spout in place, it is obvious that by tilting the can in the usual way as shown in Figure 7, the liquid will enter the tube through the small port 5. It is to be stated here that this port is of a size to retard the discharge of the fluid so as to permit it from entirely filling the tube. Hence, a small space is left between the fluid and the tube to permit air to enter from the outside and pass through the tube into the vacuum space S. Consequently, a steady flow of the fluid is thus insured.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:—

1. A detachable can spout in the form of a substantially L-shaped tube, the short reach of which is adapted to extend through an opening formed in the top of a can, the long reach thereof being adapted to extend beneath and in spaced parallelism to the top of the can so that its end will terminate in the air space in the latter, said tube having a port at the juncture of said reaches to permit fluid to enter the tube.

2. A can spout comprising a substantially L-shaped conduit, the inner end of the long reach thereof being obliquely cut so that when this end of the spout is forced through the top of the can, said oblique end will serve to bend the material cut from said opening inwardly into the can, spaced shoulders on the short reach of the tube, one shoulder being adapted to engage the outer face of the can top and the other one being adapted to engage the under face thereof, said short reach of the tube being adapted to extend through the opening formed in the can top so that when the spout is placed in position, the other reach will serve to bend said piece of material toward the can top to provide a spring for exerting yielding pressure against said last named reach.

3. A detachable can spout comprising a substantially L-shaped tube, the long reach of which is adapted to be disposed in spaced parallelism inside of the can beneath the top, the short reach being adapted to extend through an opening formed in said top, cutting means on the inner end of said long reach for penetrating the top of the can, a shoulder on the short reach engaging the under side of said top, a port arranged at the juncture of said reaches, said port being of less area than the cross-sectional area of said short reach, and packing on the exteriorly disposed portion of said short reach to engage said top.

4. A detachable can spout comprising a substantially L-shaped tube having combined cutting and piercing means on the inner end of the long reach and having a restricted port at the juncture of the two reaches, being also equipped adjacent said port with an abutment to bear against the top of the can.

5. A can spout of the type specified comprising a tube having right angularly disposed reaches, one of said reaches being adapted for disposition in spaced parallelism with the top of the cap and the other reach being designed to extend at right angles thereto, the inner end of the first named reach being provided with an external pointed rib of triangular cross section adapted to pierce the top of the can and to permit simultaneous formation of a substantially circular opening and a notch on one side of the latter, the short reach of said tube having a collar adapted to engage the upper or outer face of the can top and being provided at a spaced point with a locking lug or shoulder adapted to pass through said notch, whereby when the spout is bodily rotated, the shoulder will lock the spout in position.

In testimony whereof I have hereunto set my hand.

WALTER L. WHITESIDES.